United States Patent [19]

Baisley et al.

[11] Patent Number: 4,936,981
[45] Date of Patent: Jun. 26, 1990

[54] TANK AQUARIUM FILTER

[76] Inventors: Vernard G. Baisley, P.O. Box 263, Tomkins Cove, N.Y. 10986; George Spector, 233 Broadway Rm 3815, New York, N.Y. 10007

[21] Appl. No.: 328,904

[22] Filed: Mar. 27, 1989

[51] Int. Cl.$^5$ ............................................. A01K 63/04
[52] U.S. Cl. ................................... 210/136; 210/169; 210/416.2
[58] Field of Search .................. 119/5; 210/169, 416.2, 210/136

[56] References Cited

U.S. PATENT DOCUMENTS 4,606,821  8/1986  D'Imperio ........................... 210/169
4,678,568  7/1987  Goldman et al. .................... 210/169

Primary Examiner—Ivars Cintins
Attorney, Agent, or Firm—New York, NY 10007

[57] ABSTRACT

An aquarium filter system is provided that includes a base plate filter assembly that will clean out waste from fish and excess food from bottom of the tank to a pair of external filters so that clean water can be pumped back into the tank.

4 Claims, 1 Drawing Sheet

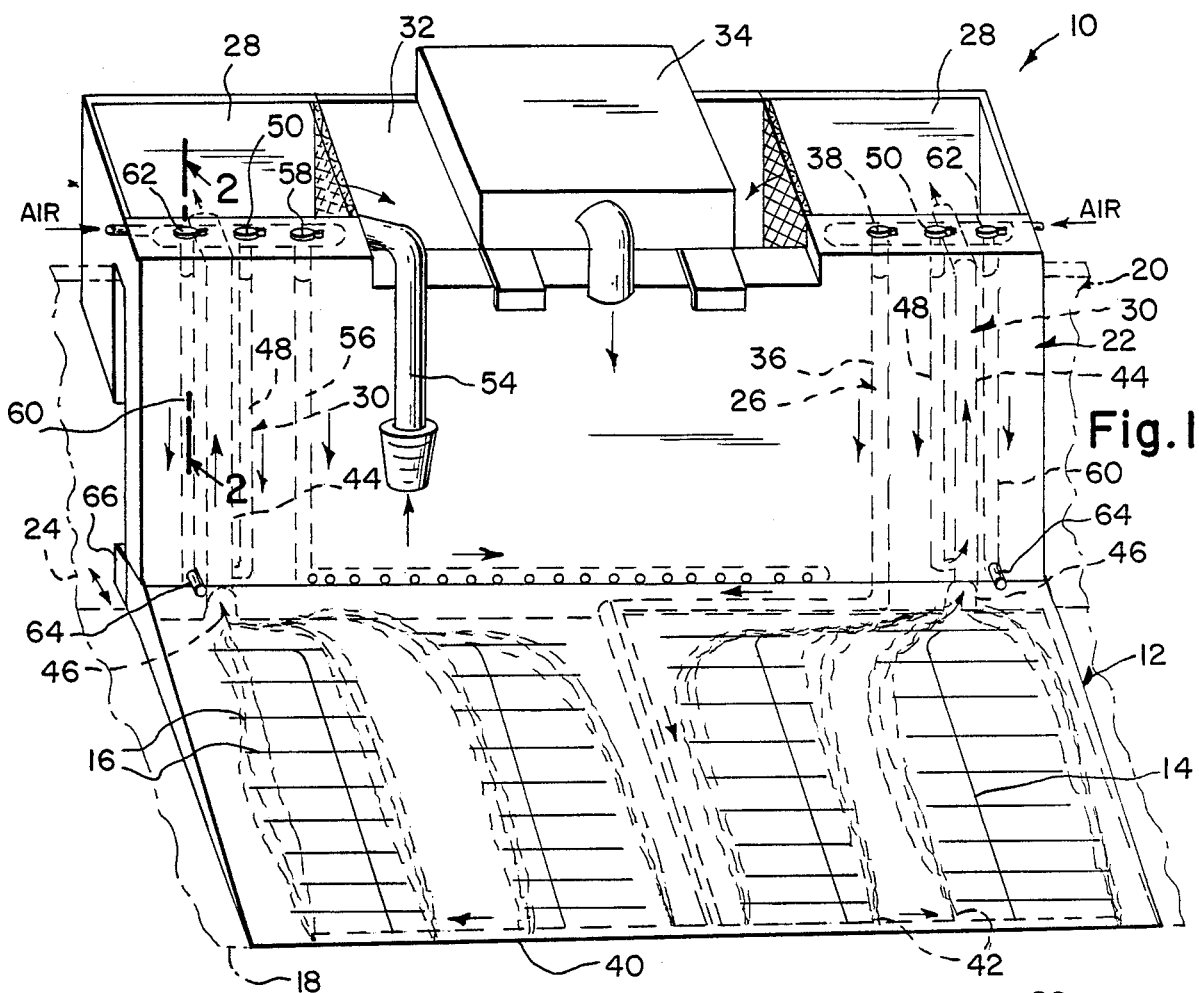
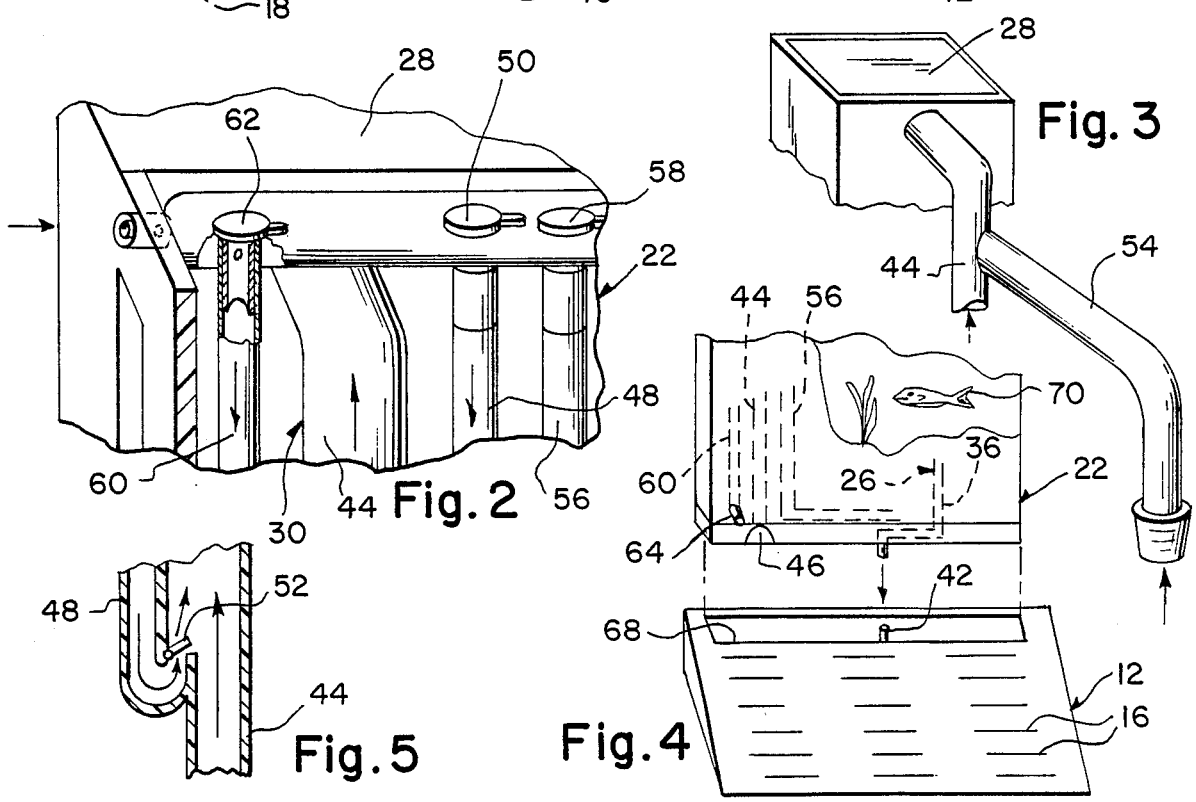

TANK AQUARIUM FILTER

BACKGROUND OF THE INVENTION

The instant invention relates generally to fish tank filters and more specifically it relates to an aquarium filter system.

Numerous fish tank filters have been provided in prior art that are adapted to purify the water by removal of waste material from the tank. While these units may be suitable for the particular purpose to which they address, they would not be as suitable for the purposes of the present invention as heretofore described.

SUMMARY OF THE INVENTION

A primary object of the present invention is to provide an aquarium filter system that will overcome the shortcomings of the prior art devices.

Another object is to provide an aquarium filter system that includes a base plate filter assembly, a built in evacuator tube and two accessory tubes, making a tank practically maintenance free to be a natural habitat for fish and other underwater inhabitants.

An additional object is to provide an aquarium filter system that will clean out waste from fish and excess food from bottom of the tank to the external filters.

A further object is to provide an aquarium filter system that is simple and easy to use.

A still further object is to provide an aquarium filter system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is an enlarged cross sectional view as indicated by line 2—2 in FIG. 1, showing the air accessory tube, waste lift tube, continuous air flow tube, bubble wall tube and air supply tank in greater detail.

FIG. 3 is a perspective view with parts broken away showing the mid debris removal tube junctioned to the waste lift tube which enters the filter box.

FIG. 4 is an exploded perspective view showing a removable base plate and back wall face having scenery thereon.

FIG. 5 is a cross sectional view showing a one way valve between the continuous air flow tube and the waste lift tube so that water cannot back into the continuous air flow tube and air therefrom will not restrict flow of water through the waste lift tube.

DETAILED DESCRIPTION OF THE PREFERRED EMBODIMENTS

Turning now descriptively to the drawings, in which similar reference characters denote similar elements throughout the several views, FIG. 1 illustrates an aquarium filter system 10 which consists of a base plate 12 having a plurality of spaced apart air travel control rails 14 and inlet slots 16. The base plate 12 is triangular shaped in cross section and disposed onto bottom 18 of an aquarium tank 20 with narrow portion facing front of the aquarium tank.

A back wall 22 extends upwardly from the base plate 12 and is disposed onto rear wall 24 of the aquarium tank 20. A first assembly 26 within the back wall 22 and the base plate 12 is for inducing air to go from under the base plate 12 at the narrow front portion to the back wall 22 to agitate waste and food matter which enters through the inlet slots 16 in the base plate 12.

A pair of external filters 28 are spaced apart, left and right, on rear surface of the back wall 22 to hang over rear wall 24 of the aquarium tank 20. A second assembly 30 within the back wall 22 is for sucking the waste and food matter from under the base plate 12 up into the filters 28. A reservoir 32 is disposed between the filters 28 on the rear surface of the back wall 22 to receive clean water from the filters 28. A water pump 34 carried on the reservoir is for pumping the clean water back into the aquarium tank 20.

The first assembly 26 includes a vertical air evacuator tube 36, built-in the back wall 22. An air valve 38 controls flow of air from an air pump (not shown) to the air evacuator tube 36. An air supply tube 40 is under the base plate 12 which fludily connects to the evacuator tube 36 and goes to the narrow front portion thereof. The air supply tube 40 has a plurality of air holes 42 at the front portion.

The second assembly 30 as shown in FIGS. 1 and includes a pair of vertical waste lift tubes 44, each built-in the back wall 22 on left and right sides thereof and have an inlet port 46 so as to be fluidly connected from the base plate 12 to the left and right filters 28. A pair of vertical continuous air flow tubes 48 are each built-in the back wall 22 and fluidly connected near each inlet port 46 so as to be fluidly connected to one of the waste lift tubes 44. A pair of air valves 50 are each provided to control flow of the air from the air pump to each continuous air flow tube 48 so that the air will help in carrying the waste and food matter in the water to one of the filters 28.

As shown in FIG. 5, a one-way valve 52 is so positioned between the continuous air flow tube 48 and the waste lift tube 44 that water cannot back into the continuous air flow tube 48 and air therefrom will not restrict flow of water through the waste lift tube 44.

As shown in FIGS. 1 and 3 a mid debris removal tube 54 can be fluidly coupled to one of the waste lift tubes 44 to remove waster and food matter from the water above the base plate 12.

A bubble tube 56 that is built-in the back wall 22 with its respective air valve 58 is shown in FIGS. 1 and 2 to provided the water with aeration. A pair of vertical air accessory tubes 60 with their respective air valves 62 are also built-in the back wall 22 on the left and right side so that various air actuated accessories (not shown) can be hooked up to outlet ports 64.

The base plate 12, as shown in FIG. 1, can be adjustable at 66 to fit various sized aquarium tanks 20, while in FIG. 4, the back wall 22 can be removable from a recess 68 in the base plate 12 for easy storage. Scenery 70, such as fish, plants, etc. can also be disposed on the back wall 22 for aesthetic purposes.

While certian novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An aquarium filter system which comprises:
   (a) a base plate having a plurality of spaced apart air travel control rails and inlet slots, said base plate being triangular shaped in cross section and disposed at the bottom of an aquarium tank said plate having a narrow portion facing the front of the aquarium tank;
   (b) a back wall extending upwardly from said base plate, disposed at the rear wall of said aquarium tank;
   (c) means within said back wall and said base plate for inducing air from under said base plate at said narrow front portion to said back wall to agitate waste and food matter which enters through said inlet slots in said base plate;
   (d) a pair of spaced external filters mounted on the rear surface of said back wall over said rear wall of the aquarium tank;
   (e) means within said back wall for sucking the waste and food matter from under said base plate up into said filters;
   (f) a reservoir disposed between said filters on the rear surface of said back wall to receive clean water from said filters; and
   (g) a water pump carried on said reservoir for pumping the clean water back into the aquarium tank.

2. An aquarium filter system as recited in claim 1, wherein said air inducing means includes:
   (a) a vertical air evacuator tube, built-in said back wall;
   (b) an air valve to control flow of air to said air evacuator tube; and
   (c) an air supply tube under said base plate which fluidly connects to said evacuator tube at one end and to said narrow front portion at another end, said air supply tube having a plurality of air holes at the front portion.

3. An aquarium filter system as recited in claim 2 wherein said sucking means includes:
   (a) a pair of vertical waste lift tubes, each mounted on left and right sides of said back wall and having an inlet port so as to be fluidly connected from said base plate to said filters;
   (b) a pair of vertical continuous air flow tubes, each built in said back wall and fluidly connected near each said inlet port (40) so as to be fluidly connected to one of said waste lift tubes; and
   (c) valves to control flow of the air from the air pump to each said continuous air flow tube so that the air will help in carrying the waste and food matter in the water to one of said filters.

4. An aquarium filter system as recited in claim 3, further comprising a pair of one-way valves each so positioned between one of said continuous air flow tubes and one of said waste lift tubes that water cannot back into each of said continuous air flow tubes and air therefrom will not restrict flow of water through each of said waste lift tubes.

* * * * *